(12) United States Patent
Chang et al.

(10) Patent No.: US 6,885,749 B1
(45) Date of Patent: Apr. 26, 2005

(54) SCRAMBLING A COMPRESSION-CODED SIGNAL

(75) Inventors: Tzu-Chieh Chang, East Hanover, NJ (US); Schuyler Reynier Quackenbush, Westfield, NJ (US); James H Snyder, North Plainfield, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/476,463

(22) Filed: Dec. 30, 1999

Related U.S. Application Data

(60) Provisional application No. 60/157,677, filed on Oct. 1, 1999.

(51) Int. Cl.[7] .......................... H04K 1/00; H04N 7/167; H04L 9/00; G06F 7/00
(52) U.S. Cl. ...................... 380/269; 380/217; 380/46; 380/28; 708/203
(58) Field of Search ................................ 380/210, 217, 380/262, 269, 46, 28; 708/203

(56) References Cited

U.S. PATENT DOCUMENTS

| | | | |
|---|---|---|---|
| 4,638,357 A | * 1/1987 | Heimbach | 380/238 |
| 5,377,266 A | 12/1994 | Katta et al. | 380/20 |
| 5,515,437 A | * 5/1996 | Katta et al. | 380/217 |
| 5,636,279 A | 6/1997 | Katta et al. | 380/20 |
| 5,706,346 A | 1/1998 | Katta et al. | 380/10 |
| 6,122,379 A | * 9/2000 | Barbir | 380/269 |
| 6,154,542 A | * 11/2000 | Crandall | 380/28 |
| 6,215,875 B1 | * 4/2001 | Nohda | 380/202 |

OTHER PUBLICATIONS

Schneier, Bruce; Applied Cryptography; 1996; John Wiley & Sons, Inc; 2nd Edition; pp. 47–74.*

* cited by examiner

*Primary Examiner*—Gilberto Barrón
*Assistant Examiner*—Jung Woo Kim

(57) ABSTRACT

This invention provides methods and apparatus for protecting data transmitted using standard compression techniques such as Huffman coding. After input data is preprocessed (filtered, quantized, etc.), the data is encoded using a Huffman coder based on Huffman codes or code books which have been scrambled to change the order of the code books and/or codes from established standard Huffman code books and/or codes. When the transmitted information is received by a Huffman code receiver, the received data may be decoded using the scrambled Huffman code book/codes to obtain the data that was transmitted by the transmitter.

8 Claims, 7 Drawing Sheets

SCRAMBLING A COMPRESSION-CODED SIGNAL

This non-provisional application claims the benefit of U.S. Provisional Application No. 60/157,677, entitled "CODE SCRAMBLING" filed on Oct. 1, 1999.

BACKGROUND OF THE INVENTION

The Applicants of the provisional application are Schuyler R. Quackenbush, James H. Snyder and Tzu-Chieh Chang. The above provisional application is hereby incorporated by reference including all references cited therein.

1. Field of Invention

This invention relates to scrambling codes.

2. Description of Related Art

Standard codes such as Huffman codes are used as a data compression technique for data transmissions. For example, many Huffman encoders and decoders are available for standard code books that enable convenient and efficient transmission of information. However, because of readily available equipment to receive Huffman encoded information, it is difficult to restrict access to transmitted information. Thus, new technology is needed to provide protection of encoded data transmissions.

SUMMARY OF THE INVENTION

This invention provides methods and apparatus for protecting data transmitted using standard compression techniques such as Huffman coding (other coding techniques using code books may also be used, such as arithmetic coding). After input data is preprocessed (filtered, quantized, etc.), the data is encoded using a Huffman coder based on Huffman codes or code books which have been scrambled to change the order of the code books and/or codes from established standard Huffman code books and/or codes. When the transmitted information is received by a Huffman code receiver, the received data may be decoded using the scrambled Huffman code book/codes to obtain the data that was transmitted by the transmitter.

The scrambling may be performed so that standard Huffman code receivers may receive and decode the scrambled data successfully. However, due to the scrambling, certain portions of the data may not be properly translated into the original data. Using such a technique, the scrambling may control the amount and kind of data that different receivers may receive. Data may be transmitted so that standard receivers may receive only a portion of the audio or video performance and/or a portion of the performance with reduced fidelity. For example, audio or video performance data (e.g., songs or movies) may be transmitted so that potential buyers may properly receive only a portion of the transmission and only with reduced fidelity while purchasers may receive descrambling information to properly receive all of the audio or video performances at full fidelity.

The Huffman code books and/or codes may be scrambled based on a fixed scrambling table or an algorithm. If an algorithm is used, the algorithm may be initialized with an initial value. The fixed table, algorithm and/or initial values may be pre-communicated among the transmitters and receivers so that data may be encoded and decoded without further communication of the scrambling information. The scrambling information may also be transmitted together with the data in either unencrypted or encrypted form so that no prior agreement would be necessary.

DETAILED DESCRIPTION OF PREFERRED EMBODIMENTS

Figure 1:
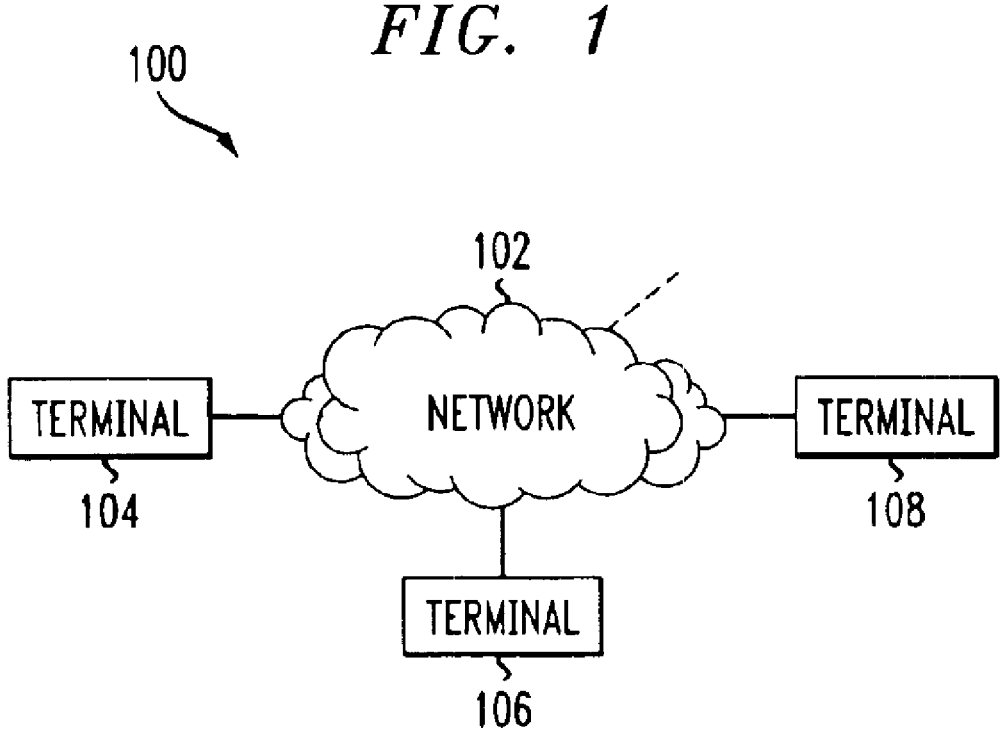
FIG. 1 shows an exemplary diagram of a data transmission system.

FIG. 1 shows an exemplary block diagram of a communication system 100 that includes a network 102 and terminals 104–108. The terminals 104–108 may communicate with each other via the network 102 by transmitting data compressed using Huffman coding techniques.

Figure 2:
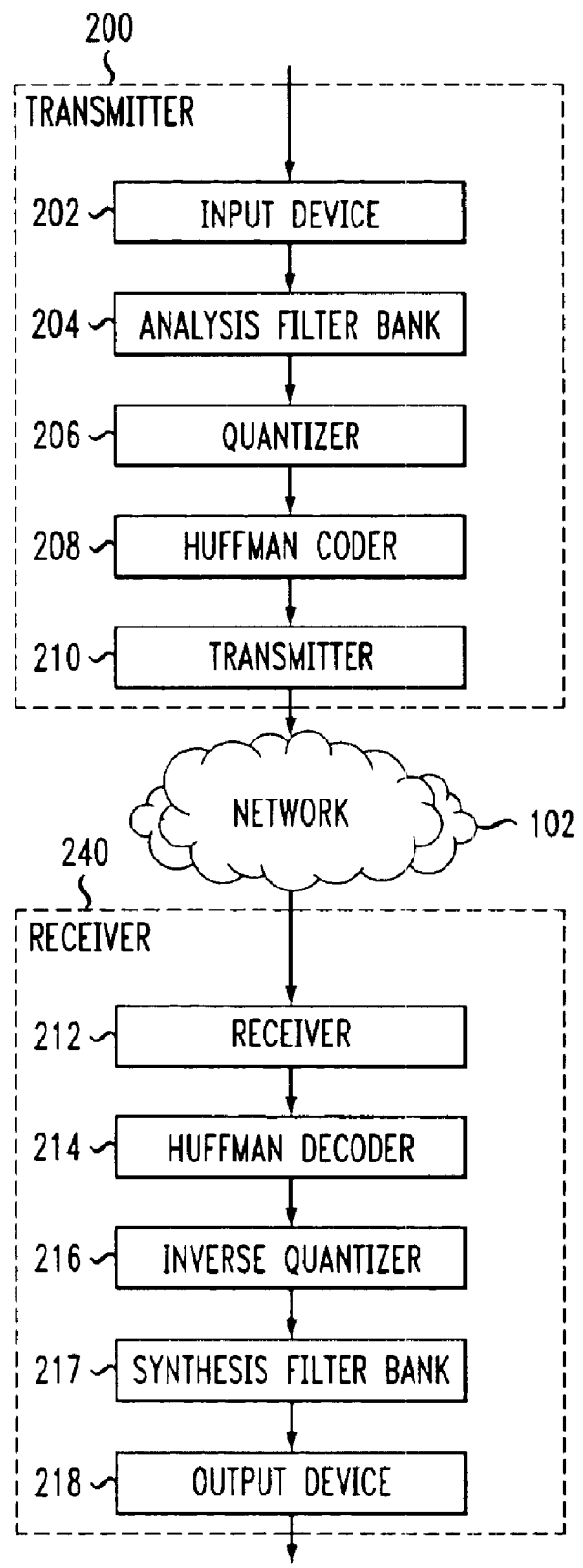
FIG. 2 shows an exemplary block diagram of a Huffman code transmitter and a Huffman code receiver.

FIG. 2 shows an example of a transmitter 200 and a receiver 240 for transmitting and receiving data compressed and decompressed using a Huffman coder 208 and a Huffman decoder 214, respectively. In the transmitter 200, input data is received via an input device 202 and the received input data is filtered via an analysis filter bank 204. For example, if the input data is audio, the filter bank 204 generates a time-frequency domain data where the filters of the filter bank 204 separate frequency components of the input data to generate a set of time data for predetermined frequency bands. The time-frequency data is quantized by a quantizer 206 and the output of the quantizer is encoded by a Huffman coder 208 based on entropy (probability of occurrence) of the data as is well known in the art. The Huffman encoded data is then transmitted via the transmitter 210 to the network 102.

The receiver 240 receives the transmitted data via the receiver 212 and the received data is Huffman decoded via the Huffman decoder 214. The Huffman coder 208 and the Huffman decoder 214 use the same code book(s) so that the data decoded by the Huffman decoder 214 is the quantized outputs generated by the quantizer 206. The output of the Huffman decoder 214 is inverse quantized by an inverse quantizer 216 and synthesized by the synthesis filter bank 217 to generate data that is substantially identical to the input data input via the input device 202. The data is then output via the output device 218.

While the above example shows a filter bank 204 and quantizer 206 as "preprocessing" devices, other types of preprocessing may also be used. In fact, any information that may be encoded/decoded using Huffman codes may also be scrambled/descrambled using this invention. In addition, while Huffman codes are discussed as an example, other codes using code books may also be used.

Conventional transmitters and receivers using the Huffman code compression/decompression technique use standard Huffman code books. Thus, Huffman coders and decoders 208 and 214 are commonly available to perform the Huffman code compression and decompression. In addition, the network 102 may be a wireless communication network where the transmitter 210 transmits wirelessly to the receiver 212. In such a network 102, the wireless transmission may be intercepted by other than intended parties so that security of the transmitted information may be compromised. The invention protects information compressed via standard Huffman codes by providing methods and apparatus for scrambling the standard Huffman codes so that the transmitted information may receive varying degrees of protection. Also, data transmissions may be selectively protected by providing different portions of the descrambling information to various parties.

Figure 3:
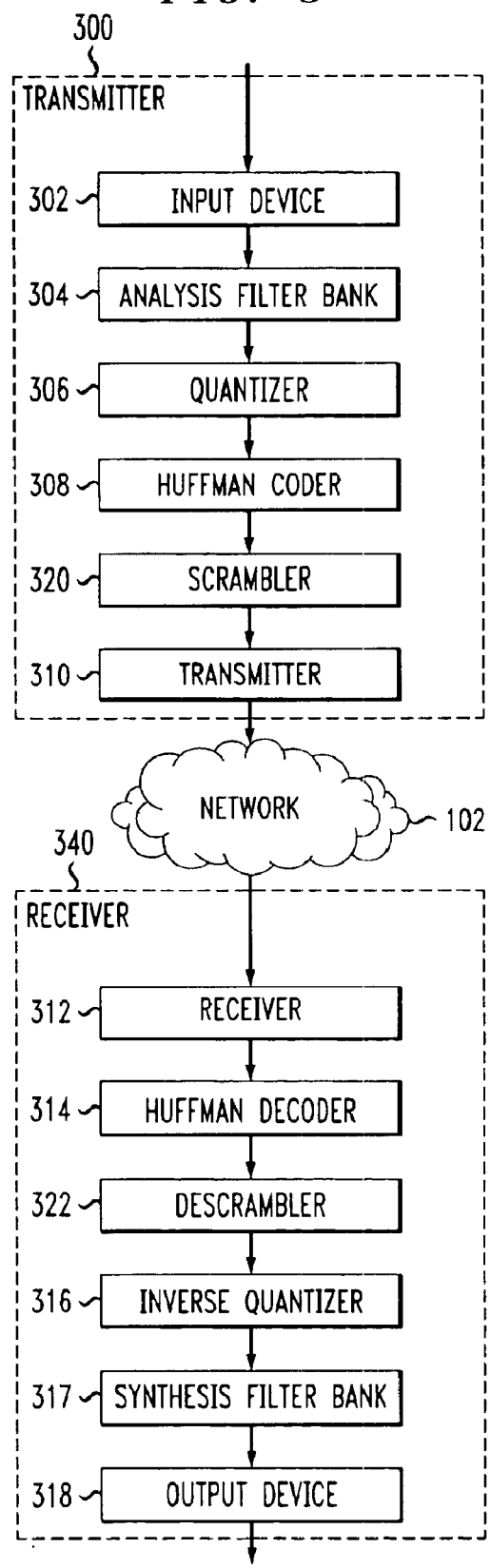
FIG. 3 shows an exemplary block diagram of an audio signal compression system with a Huffman code transmitter and a Huffman receiver that scrambles and descrambles Huffman codes, respectively.

FIG. 3 shows a transmitter 300 and a receiver 340 that includes a scrambler 320 and a descrambler 322, respectively. Elements 302–310 and 312–318 of the transmitter 300 and receiver 340 perform similar functions as elements 202–210 and 212–218 of the transmitter 200 and receiver 240 as shown in FIG. 2. The scrambler 320 scrambles the encoded information generated by the Huffman coder 308 so that any third party that receives the information transmitted by the transmitter 310 and decodes the information via standard Huffman decoders 214, for example, may only properly decode that information permitted by the scrambler 320. The descrambler 322 performs a reverse process of the scrambler 320 so that the synthesizer 317 may generate accurately the data input by the input device 302 for output by the output device 318.

Figure 4:
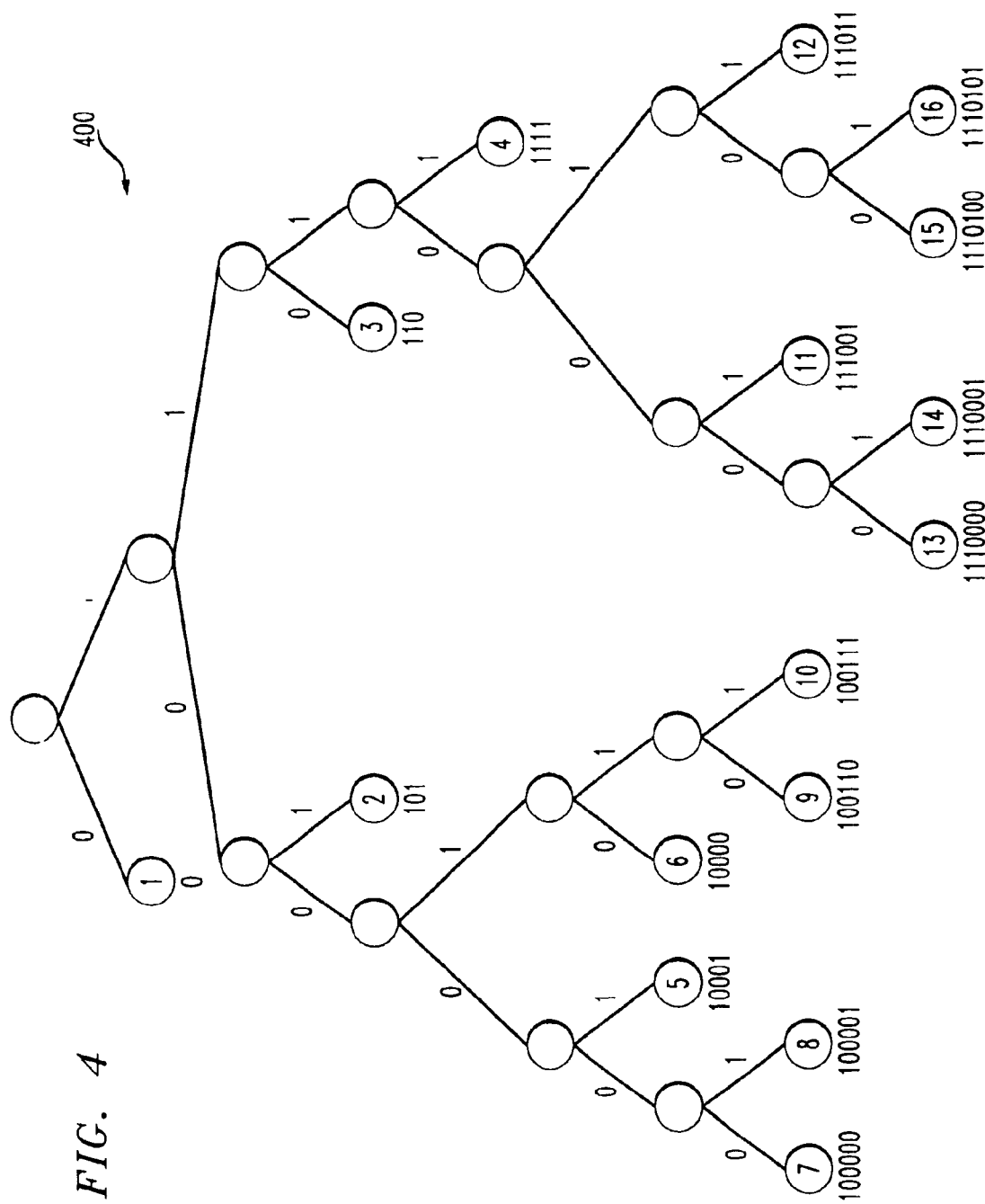
FIG. 4 shows an example of a Huffman code book in a tree format.

The scrambler and descrambler 320 and 322 take advantage of characteristics of the codes generated by the Huffman coding technique. FIG. 4 shows an exemplary Huffman code book via a tree 400. Leaf nodes 1–16 correspond to values to be encoded. Based upon the entropy associated with each of the values to be encoded, a code is assigned for encoding the associated value. As is well known, the Huffman code assigns shorter bit length codes to those values that have a higher probability of occurrence. Thus, the value corresponding to leaf node 1 has the highest probability of occurrence and is assigned a code length of one bit having the value "0". Leaf nodes 2 and 3 have substantially equal probabilities of occurrence and are assigned code lengths of 3 bits having the values of "101" and "110". In the same manner, codes of varying bit lengths are assigned to data values corresponding to the remaining leaf nodes 4–16.

This leaf nodes 1–16 may be classified by rank. For example, leaf nodes 1–16 that are assigned the smaller number of encoded bits have higher rank than leaf nodes assigned a larger number of encoded bits. Thus, leaf node 1 has rank 7 while leaf nodes 2 and 3 have rank 5. Assuming that the leaf nods 1–16 in the tree 400 are assigned codes in an optimal way, any scrambling of the Huffman codes may only be performed among leaf nodes 1–16 of the same rank to maintain data compression efficiency of the Huffman code. For example, the codes corresponding to leaf nodes 2 and 3 may be interchanged so that leaf node 2 is assigned "110" and leaf node 3 is assigned "101". Similarly, the codes for leaf nodes 5 and 6 may be interchanged, the codes for leaf nodes 7–12 may be mixed in any order and codes corresponding to leaf nodes 13–16 may also be mixed. The exact "mixing" may be determined by a translation table or by an algorithm which may be initialized with an initial value, for example.

If the scrambling is performed by a pre-established algorithm, for example, the codes within a group defined by equal code length or equal code entropy may be scrambled based on a pseudo-random number generated by a pseudo-random number generator. For example, if the number of codes within a group is a power of 2 such as 16, then a four-bit linear feedback shift register (LFSR) may be used to generate a maximum-length pseudo-random order based on a seed or an initial value. If the LFSR taps are agreed upon and known by both the transmitter and the receiver, the seed for the LFSR controls the scrambling of the codes within the group. Thus, the scrambling information may be communicated between the transmitter and receiver by simply transmitting the initial value.

If the above scrambling was performed, a Huffman decoder using standard code books may successfully decode the transmitted information. However, without the descrambler 322, the synthesizer 217 cannot synthesize the originally input data because the corresponding values cannot be obtained due to the scrambling. In this way, parties that do not have the descrambling translating table, algorithm or initial value for the algorithm cannot properly receive the transmitted information.

For example, Table 1 below shows the code book shown in FIG. 4 where each code of the code book is associated with a code index. The codes in Table 1 may be scrambled by changing the order of the codes within each rank as shown by Table 2 below. The codes may, of course, be scrambled across rank boundaries. However, if the rank boundaries are crossed, the efficiency of the coding may be compromised. For example, if codes corresponding to code index 7 was interchanged with the code corresponding to code index 3, then the data compression efficiency most likely will be compromised because the probability of occurrence for the code "110" is much higher than the probability of occurrence for the code "100000". Thus, maintaining the scrambling within each rank does not compromise the data compression efficiency of the Huffman code and at the same time restricts access to the transmitted information to only those who are authorized to receive the information.

TABLE 1

| Code Index | Code |
|---|---|
| 1 | 0 |
| 2 | 101 |
| 3 | 110 |
| 4 | 1111 |
| 5 | 10000 |
| 6 | 10001 |
| 7 | 100000 |
| 8 | 100001 |
| 9 | 100110 |
| 10 | 100111 |
| 11 | 111001 |
| 12 | 111011 |
| 13 | 1110000 |
| 14 | 1110001 |
| 15 | 1110100 |
| 16 | 1110101 |

TABLE 2

| Code Index | Code |
|---|---|
| 1 | 0 |
| 3 | 101 |
| 2 | 110 |
| 4 | 1111 |
| 6 | 10000 |
| 5 | 10001 |
| 12 | 100000 |
| 11 | 100001 |

TABLE 2-continued

| Code Index | Code |
|---|---|
| 8 | 100110 |
| 9 | 100111 |
| 7 | 111001 |
| 10 | 111011 |
| 15 | 1110000 |
| 16 | 1110001 |
| 14 | 1110100 |
| 13 | 1110101 |

The scrambling may be performed in such a way as to permit any receiver to decode a portion of the transmitted information properly while preventing proper reception of other portions of the transmitted data. For example, if it is desirable to transmit a video or audio performance in the form of an advertisement, certain portions of the video or audio information may be transmitted in an unscrambled manner while other portions are scrambled. In this way, any party is permitted to gain a general sense of the audio or video performance without having the full quality of the original performance. To achieve the above objective, scrambling may be distributed in time so that for short time intervals of the video or audio performance, the data is not scrambled to permit full quality reception, while during other periods of time, high frequency components of the transmission may be scrambled to permit proper reception only of low frequency components, for example.

Returning to FIG. 3, it may be recalled that the input data is received by the input device 302 and filtered by an analysis filter bank 304. The filter bank 304 may include a large number of narrow band filters where frequency components of the input data are separated in the frequency spectrum. The frequencies of the input data may be grouped into regions and each of the frequency regions may be encoded separately by the Huffman coder 308. In this way, selected frequency regions may be scrambled by the scrambler 320 while other frequency regions may be transmitted unscrambled.

Figure 5:
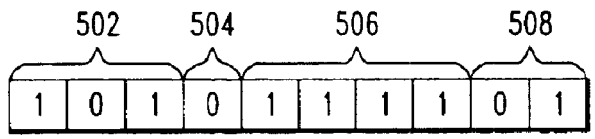
FIG. 5 shows a Huffman code for a vector of unsigned quantities.

The scrambling process may be further restricted if the Huffman code encodes a vector of unsigned quantized values having the signs of each of the encoded quantizer values appended to the Huffman code. For example, FIG. 5 shows a vector 500 of two unsigned Huffman codes. Portions 502 and 506 are Huffman codes while portions 504 and 508 are signs corresponding to the encoded unsigned values. In this example, sign bits corresponding to nonzero unsigned values are appended to the Huffman code vector (since a value of zero does not have a sign bit). Thus, if the Huffman code "101" is the encoded values of zero and one, then the sign bit 504 is associated with the value one. Similarly, if the Huffman code "1111" is the encoded values of minus one and two, then the sign bits 508 are associated with these two values.

Figure 6:
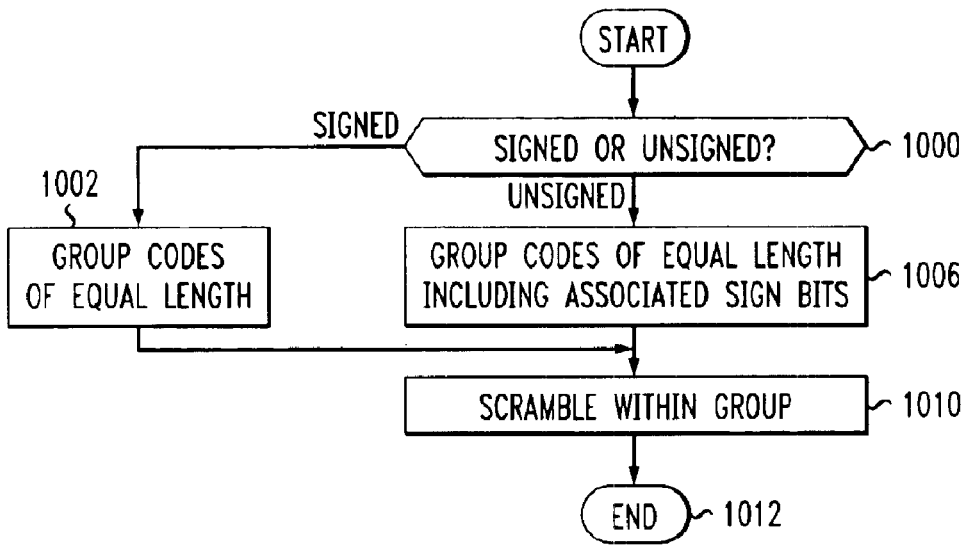
FIG. 6 shows a flowchart for scrambling Huffman codes.

FIG. 6 shows a flowchart for a Huffman code scrambling process. In step 1000, the process determines whether the Huffman codes are encoding signed or unsigned values. If signed values are encoded, the process goes to step 1002; otherwise, the process goes to step 1006. In step 1002, the process forms groups of codes of equal length and goes to step 1010. In step 1006, the process groups the codes by equal length where the length includes appended sign bits and goes to step 1010. In step 1010, the process scrambles the codes within the groups formed by the above steps based on a table or an algorithm using a specific initial value, for example, and saves the table/algorithm/initial value and goes to step 1012 to end the process.

While the above discussion focuses on scrambling Huffman codes of equal length or equal entropy, scrambling may also be performed by intermixing Huffman code books. As discussed earlier, the input data may be processed by a filter bank to obtain a frequency spectrum of the input data. The frequency spectrum may be separated into frequency regions where each of the regions may be treated separately. In particular, each region may be encoded by a different Huffman code book that may be tailored for expected characteristics of a particular frequency region. In addition, different Huffman code books may be used for different time intervals of the input data for any particular frequency region. Thus, the encoding process may apply different code books across different time intervals and frequency regions.

Figure 7:
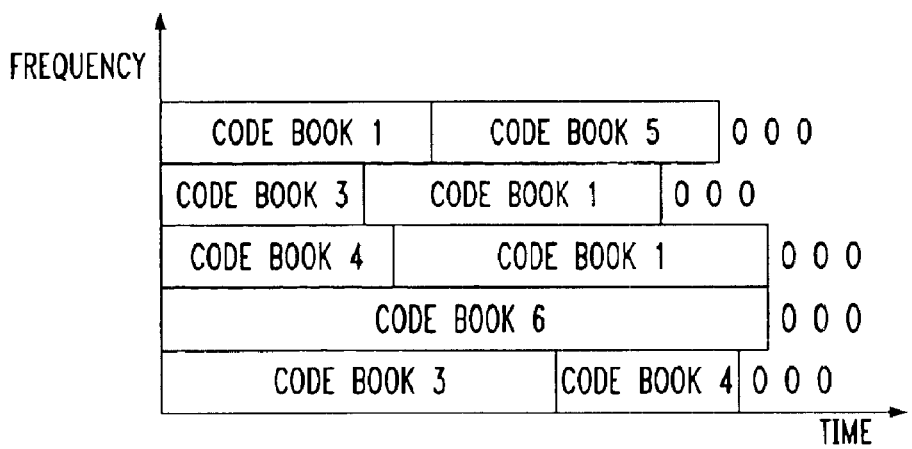
FIG. 7 is a diagram showing Huffman coding using multiple code books.

As shown in FIG. 7, the time-frequency domain may be covered by one or more code books where each of the code books covers a specific time-frequency region. The order and sequence of code books may be as indicated by pre-agreed-upon signaling mechanism based on transmitted information (e.g., a standard). Thus, data may be received and decoded based on the indicated code book sequences so that data may be successfully retrieved.

Scrambling may be achieved by encoding the data using different code books than what is indicated. The substitute code book must have similar characteristics to the code book being substituted in order for the Huffman decoder of the receiver to successfully receive the data. For example, code books may be interchanged as long as the codes of one code book may be decoded by the decoder of the other code book even though the resulting decoded values may not be identical. Such a condition may be met if all the codes of one code book are also valid codes of another code book, for example.

When different code books or scrambling order are used for different time intervals of the data, special data may be inserted "midstream" to signal the receiver of a code book or scrambling order change. This data may be transmitted via a pre-agreed upon method (i.e., a standard) for transmitting "ancillary" data that is not required to decode the transmitted information. Such a mechanism would permit all decoders to read the ancillary data and continue to decode the transmitted information, but only certain decoders would know how to interpret the data as a set of special codes. For example, special codes for the current code book may be used to signal a change in the code book or scrambling order. The assignment of such codes may be by prior agreement or transmitted with the data in encrypted or non-encrypted form.

Scrambling may also be achieved by interchanging codes of equal length among any of the code books. For example, in FIG. 7, codes in code book 1 may be scrambled with codes of equal length in code books 3, 4, 5, and 6. In this way, standard decoders may decode received communication, but the inverse quantized data are in scrambled order.

The above discusses scrambling techniques that permit any decoder to decode the scrambled codes. However, the scrambling may be performed so that not all decoders can decode the scrambled codes. For example, the scrambling may be performed so that any decoder without knowledge of the scrambling generates invalid results so that decoding of the received compressed data is not possible altogether. Also, if invalid codes are used as midstream data to signal code books of scrambling changes in a way that cannot be read by "standard" decoders, proper decode would not be possible without prior knowledge.

In summary, the codes or books may be scrambled based on 1) a fixed table; or 2) an algorithm, and the algorithm may be initialized by an initial value (e.g., a seed). The scrambling information (fixed table, algorithm and/or seed) may be communicated between the transmitters and receivers in at least the following three ways:

1) the scrambling information may be communicated to both the transmitters and receivers in a prior communication so that at the time of transmission, the scrambling information is known by both transmitters and receivers;

2) the scrambling information may be transmitted together with the data in an agreed upon format so that the receivers may receive the descrambling information with the communication of the data to perform the decoding process; and 3) the scrambling information may be encrypted by any of the available encryption algorithms and the encrypted scrambling information may be transmitted with the data.

The scrambling process may be performed in such a way as to allow any receiver to receive and decode the information without the benefit of descrambling. However, decoding the transmitted data without the scrambling information may result in partial reception of the data where the percentage of data received may range between 0 and 100%.

Figure 8:
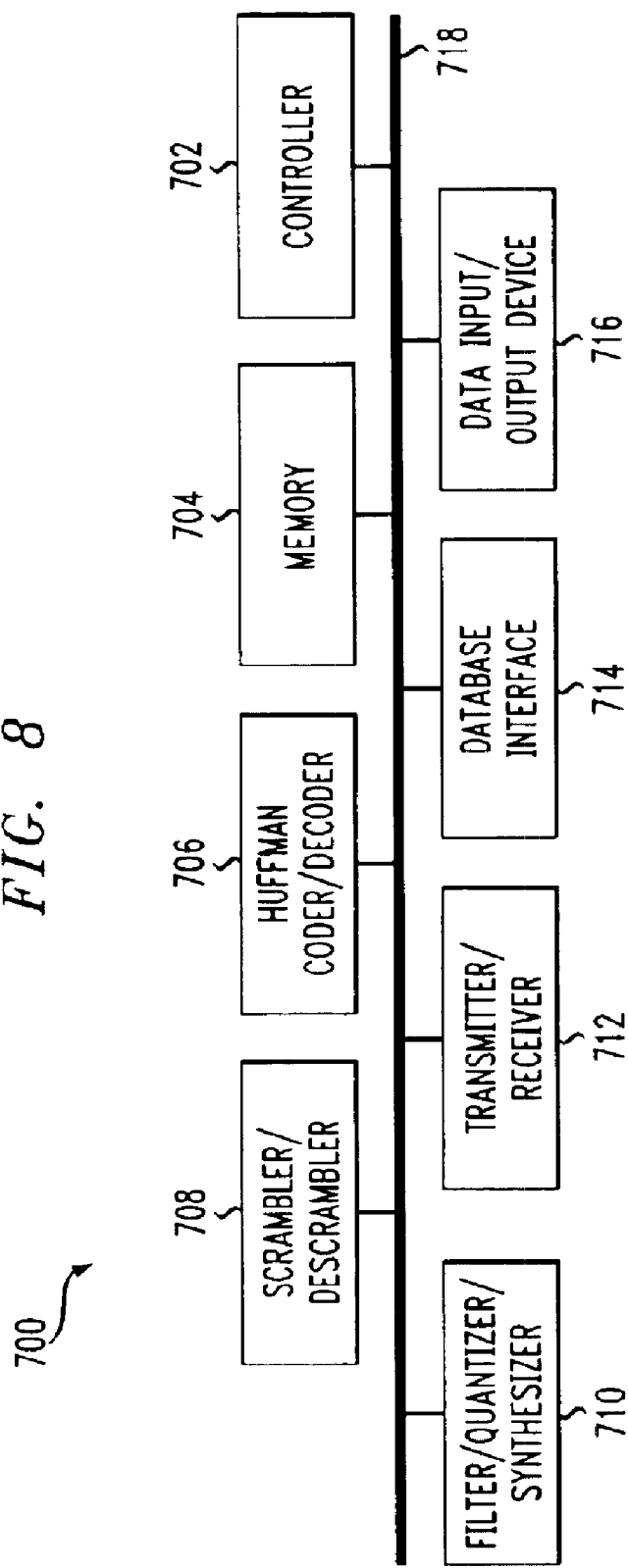
FIG. 8 shows an exemplary block diagram of a transmitter/receiver using Huffman code compression.

FIG. 8 shows an exemplary block diagram of a Huffman code (HC) transmitter/receiver 700. The HC transmitter/receiver includes a controller 702, a memory 704, a Huffman coder/decoder 706, a scrambler/descrambler 708, a filter/quantizer/synthesizer 710, a transmitter/receiver 712, a database interface 714 and a data input/output device 716. The above components are coupled together via a signal bus 718. The above HC transmitter/receiver 700 is presented only as an example for the purpose of discussion and not limiting the invention in any way. For example, architectures other than the bus architecture may be used and also Huffman coder/decoder 700, scrambler/descrambler 708 and transmitter/receiver 712 may be implemented separately in different units, for example.

As a transmitter, input data is received by the data input/output device 716 and forwarded to the filter/quantizer/synthesizer 710 for filtering and quantization. The controller 702 sends commands to the scrambler/descrambler 708 to command scrambling of the Huffman code books if desired and/or Huffman codes within each of the Huffman code books. The scrambler/descrambler 708 retrieves the appropriate Huffman code books from either the memory 704 or from a database via the database interface 714. The scrambler/descrambler 708 may scramble the order of the Huffman code books and/or the Huffman codes within any of the retrieved Huffman code books including any in-stream data and output the final scrambled Huffman code books to the Huffman coder/decoder 706 for encoding the data output from the filter/quantizer/synthesizer 710. The Huffman coder/decoder 706 encodes the output of the filter/quantizer/synthesizer 710 and outputs the encoded data to the transmitter/receiver 712 for outputting via the network 102.

On the receiver side, the transmitted information is received via the transmitter/receiver 712 and the received data is forwarded to the Huffman coder/decoder 706. The controller 702 of the receiver 700 extracts from the received information any tables, algorithm identification or algorithm initialization data either directly or after deencryption and sends the information to the scrambler/descrambler 708. The scrambler/descrambler 708 retrieves Huffman code books either from the memory 704 or from a database via the database interface 714 and constructs the descrambling codes and/or code books and provides the appropriate code/code books including any in-stream codes to the Huffman coder/decoder 706 for decoding the received information. The Huffman coder/decoder 706 decodes the received information and forwards the decoded information to the filter/quantizer/synthesizer 710. The filter/quantizer/synthesizer 710 synthesizes an output from the decoded data and forwards the synthesized outputs to the data input/output device 716 for output from the receiver 700.

Figure 9:
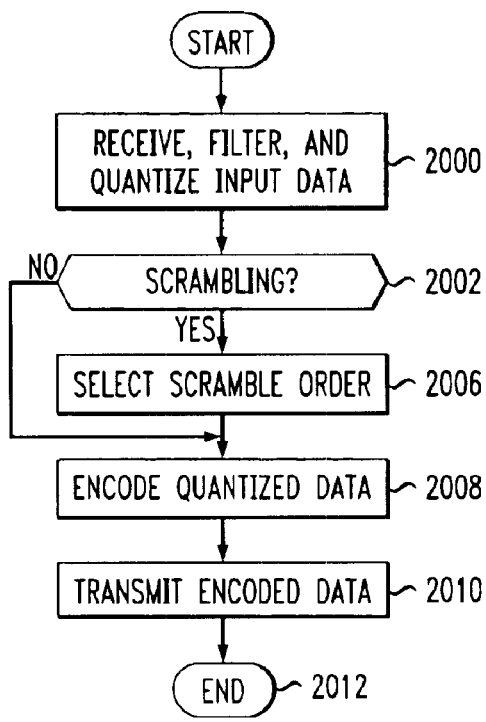
FIG. 9 shows a flowchart of an exemplary process for transmitting data using scrambled Huffman codes.

FIG. 9 shows a flowchart of an encoding process for the HC transmitter/receiver 700. In step 2000, the transmitter/receiver 712 receives the data and the filter/quantizer/synthesizer 710 filters the input data. Then, the HC transmitters receiver 700 goes to step 2002. In step 2002, the controller 702 determines whether scrambling is desired. If desired, the controller 702 goes to step 2006; otherwise, the controller 702 goes to step 2008.

In step 2006, the controller 702 initializes the scrambler/descrambler 708 for scrambling Huffman code books and/or Huffman codes of any of the code books. The scrambler/descrambler 708 retrieves necessary information from either the memory 704 or a database via the database interface 714 and forwards the scrambling information to the Huffman coder/decoder 706. Then, the HC transmitter/receiver goes to step 2008. In step 2008, the Huffman coder/decoder 706 encodes the quantized data generated by the filter/quantizer/synthesizer 710 and forwards the encoded data to the transmitter/receiver 712. Then, the HC transmitter/receiver 700 goes to step 2010. In step 2010, the transmitter/receiver 712 transmits the encoded data and the HC transmitter/receiver goes to step 2012 to end the process.

Figure 10:
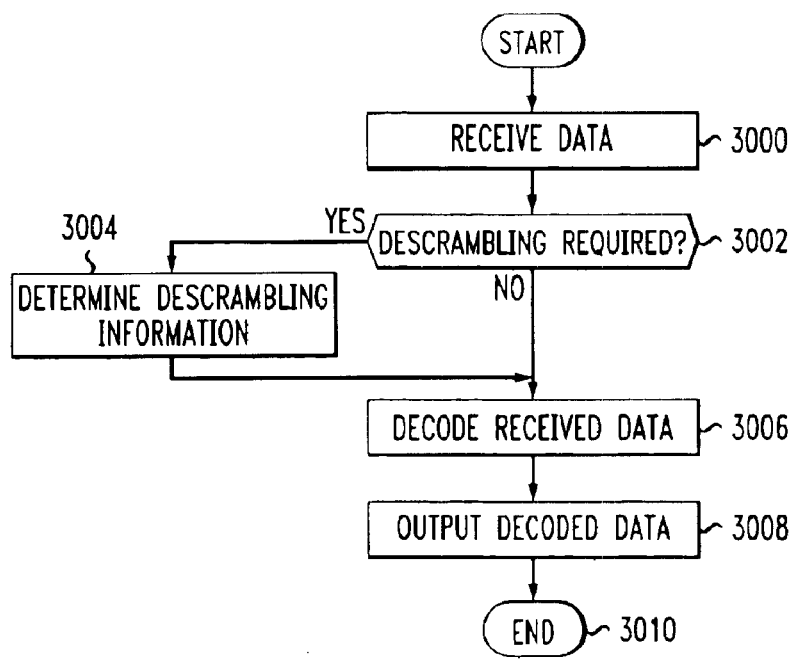
FIG. 10 shows a flowchart of an exemplary process for receiving scrambled Huffman codes.

FIG. 10 shows a flowchart for a received process of the HC transmitter/receiver 700. In step 3000, the transmitter/receiver 712 receives the data and the HC transmitter/receiver 700 goes to step 3002. In step 3002, the controller 702 determines whether descrambling is required from data received from the input data stream. If descrambling is required, the HC transmitter/receiver 700 goes to step 3004; otherwise, the HC transmitter/receiver 700 goes to step 3006.

In step 3004, the controller 702 sends descrambling commands to the scrambler/descrambler 708 which in turn retrieves descrambling information from either the memory 704 or a database via the database interface 714. The scrambler/descrambler 708 initializes the Huffman coder/decoder 706 with the proper Huffman code books for decoding the received data and the HC transmitter/receiver 700 goes to step 3006.

In step 3006, the Huffman coder/decoder 706 decodes the received data and outputs the decoded data to the filter/quantizer/synthesizer 710 for generating synthesized outputs. After the filter/quantizer/synthesizer 710 generates synthesized outputs, the HC transmitter/receiver 700 goes to step 3008. In step 3008, the data input/output device 716 receives the synthesized outputs and outputs the decoded data. Then, the HC transmitter/receiver 700 goes to step 3010 to end the process.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method comprising the steps of accepting a stream of data, developing from said data a stream of codewords, where each codeword belongs to a code book, where in connection with a selected portion of said data, each codeword is developed in accordance with process A, or process B, where
(a) from strings of data bits, process A creates codewords consisting of one or more concatenated bits $b_0, \ldots b_j$, where j is an integer that may differ from codeword to codeword, pursuant to a standard first code book, followed by replacing the created codewords with another created codeword consisting of one or more concatenated bits $a_0, \ldots a_k$, that is different from said created codebook and belongs to a second code book, said another created codeword being created by other than setting
  (i) j to k,
  (ii) $a_0, \ldots a_{j-1}$ to $b_0, \ldots b_{j-1}$, and
  (iii) $a_j$ either to $b_j$ or an inverse thereof,
(b) from strings of data bits, process B creating codewords pursuant to a non-standard code book said created codewords being converted codewords;

in connection with other than said selected portion of said developed codewords, if any, each codeword, consisting of one or more concatenated bits $b_0, \ldots b_j$, where j is an integer that may differ from codeword to codeword, is created pursuant to said standard first code book; and transmitting said codewords created in connection with said selected portion, and in connection with said other than said selected portion, if any where codewords provided by process A or process B to said step of transmitting have a length that is equal to codewords that would have been created by employing said standard first code book.

2. The method of claim 1 where said second code book is other than said standard code book.

3. The method of claim 1 where said second code book is said standard code book.

4. The method of claim 1 where said selected portion comprises sub-portions, and each of the sub-portions develops codewords pursuant to in accordance with process A, or process B that employs its own second code book.

5. The method of claim 1 where said selected portion is based on information content.

6. The method of claim 1 where said selected portion is time intervals based.

7. The method of claim 1 where said selected portion is based on spectrum of information contained in said data stream.

8. The method of claim 1 where said second code book is selected from a set of preselected code books, and the selection of said second code book is not fixed.

* * * * *